US008033344B2

(12) United States Patent
Glauning et al.

(10) Patent No.: US 8,033,344 B2
(45) Date of Patent: Oct. 11, 2011

(54) POWER SUPPLY MODULE FOR AN ELECTRIC POWER TOOL

(75) Inventors: Rainer Glauning, Aichtal-Groetzingen (DE); Marcin Rejman, Waiblingen (DE); Wolf Matthias, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 122 days.

(21) Appl. No.: 12/426,507

(22) Filed: Apr. 20, 2009

(65) Prior Publication Data

US 2009/0202895 A1 Aug. 13, 2009

(51) Int. Cl.
*H01M 2/10* (2006.01)

(52) U.S. Cl. ........................................ 173/217; 173/171

(58) Field of Classification Search .................. 173/171, 173/217; 310/47, 50; 429/100
See application file for complete search history.

(56) References Cited

U.S. PATENT DOCUMENTS

| | | | | |
|---|---|---|---|---|
| 3,952,239 | A * | 4/1976 | Owings et al. | 320/113 |
| 3,973,179 | A * | 8/1976 | Weber et al. | 320/113 |
| 3,999,110 | A * | 12/1976 | Ramstrom et al. | 320/112 |
| 5,122,427 | A * | 6/1992 | Flowers et al. | 429/97 |
| 5,144,217 | A * | 9/1992 | Gardner et al. | 320/110 |
| 5,259,769 | A * | 11/1993 | Cruise et al. | 439/65 |
| 5,368,954 | A * | 11/1994 | Bruns | 429/97 |
| 5,473,242 | A * | 12/1995 | McKenna | 320/113 |
| 5,671,815 | A | 9/1997 | Kabatnik et al. | |
| 5,792,573 | A * | 8/1998 | Pitzen et al. | 429/97 |
| 6,179,192 | B1 * | 1/2001 | Weinger et al. | 227/8 |
| 6,220,368 | B1 * | 4/2001 | Ark et al. | 173/178 |
| 6,302,727 | B1 * | 10/2001 | Fedorjaka | 439/500 |
| 6,304,058 | B2 * | 10/2001 | Watson et al. | 320/117 |
| 6,350,149 | B1 * | 2/2002 | Nakane | 439/500 |
| 6,357,534 | B1 * | 3/2002 | Buetow et al. | 173/217 |
| 6,464,512 | B2 * | 10/2002 | Morita | 439/66 |
| 6,515,451 | B2 * | 2/2003 | Watson et al. | 320/117 |
| 6,551,143 | B2 * | 4/2003 | Tanaka et al. | 439/682 |
| 6,568,089 | B1 * | 5/2003 | Popik et al. | 30/392 |
| 6,573,621 | B2 * | 6/2003 | Neumann | 307/150 |
| 6,729,413 | B2 * | 5/2004 | Turner et al. | 173/217 |
| 2002/0049000 | A1 * | 4/2002 | Tanaka et al. | 439/660 |
| 2002/0067080 | A1 * | 6/2002 | Neumann | 307/150 |
| 2006/0113100 | A1 * | 6/2006 | Hsu et al. | 173/217 |
| 2006/0244318 | A1 * | 11/2006 | Glauning et al. | 310/50 |

FOREIGN PATENT DOCUMENTS

| | | |
|---|---|---|
| CN | 2566999 | 8/2003 |
| DE | 195 21 426 | 12/1996 |
| DE | 295 13 651 U1 | 2/1997 |
| FR | 2 623 345 | 5/1989 |

* cited by examiner

*Primary Examiner* — Brian D Nash
(74) *Attorney, Agent, or Firm* — Michael J. Striker

(57) ABSTRACT

A power supply module for interchangeable attachment to an electric tool has a module housing, which receives a battery and an introduction dome, formed integrally onto the module housing, for guiding the tool, on which dome there is an electrical interface with the electric power tool and at least one form-locking element for making a form lock with the tool housing is located.

7 Claims, 2 Drawing Sheets

POWER SUPPLY MODULE FOR AN ELECTRIC POWER TOOL

CROSS-REFERENCE TO RELATED APPLICATION

The application claims the benefit of priority of U.S. patent application Ser. No. 10/552,214, filed Oct. 6, 2005, which issued on Jun. 30, 2009 as U.S. Pat. No. 7,552,780. The US patent application claims the benefit of priority under 35 USC §119(a-d) to German patent application No. 102004012071.4, filed on Mar. 12, 2004. The subject matter of the aforesaid U.S. patent application/German patent application is further explicitly incorporated herein by reference thereto.

The invention described and claimed hereinbelow is also described in German Patent Application DE 10 2004 012 71.4 filed on Mar. 12, 2004. This German Patent Application, whose subject matter is incorporated here by reference, provides the basis for a claim of priority of invention under 35 U.S.C. 119(a)-(d).

BACKGROUND OF THE INVENTION

The present invention relates to a power supply module for an electric power tool.

In cordless electric power tools, such as battery-operated drills or screwdrivers, a power supply module, known as a battery pack, is located on the underside of the handle formed integrally onto the tool housing, and this module, for fast replacement and automatic contacting, is equipped with an introduction dome that extends in the axial direction of the handle and that can be inserted into a guide sleeve located in the handle of the tool housing. There are electrical contacts, connected to the battery, on the introduction dome that at the end of the insertion process contact electrical contacts located in the tool housing, so that the electrical coupling of the tool to the battery at the tool-module interface is automatically established as the battery pack is attached to the tool.

For ease of handling when the battery pack is being replaced, the battery pack must be introduced carefully; the prerequisite for this is that the introduction dome be slightly caught by the guide sleeve, which can be achieved by providing sufficient looseness or play in the region of the introduction opening of the guide sleeve. For reliable electrical contacting at the battery pack-tool interface during tool operation, conversely, tight reception of the introduction dome in the guide sleeve with as little play as possible is necessary. To meet these demands, the inner wall of the guide sleeve is provided with interception ribs, and the outer wall of the introduction dome is provided with corresponding groovelike rib receptacles.

SUMMARY OF THE INVENTION

Accordingly, it is an object of the present invention to provide a power supply module which is a further improvement of existing power supply modules.

In keeping with these objects and with others which have become apparent hereinafter, one feature of the present invention resides, briefly stated, in a power supply module for interchangeable attachment to a tool housing (12) of an electric power tool, comprising a module housing (13) that receives the battery or an accumulator; an introduction dome (14) for guiding the tool, formed integrally on the module housing and on which there is an electrical interface with the electric power tool; and at least one form-locking element for producing a form lock with the tool housing (12) and located on a free end of the introduction dome (14).

The power supply module of the invention has the advantage that the at least one form-locking element located on the free end of the introduction dome, which element may be embodied as a recess or rib, makes a form lock with the tool housing that assures a firm, play-free seat of the power supply module in the tool housing. Since the freedom from play of the form-locking element is established on the free end in the contact region of the introduction dome, the contacts, contacting one another in the electrical interface, of the power supply module and the tool housing cannot shift counter to one another or briefly lift from one another, so that high resistance to vibration and closure of the contacts is achieved.

In an advantageous embodiment of the invention, the form-locking element is a recess located in the side wall of the introduction dome, which recess extends into the open on the free end of the introduction dome. Because the recess extends into the end face of the introduction dome, the end face of the introduction dome is reduced in size. Because of the reduced-size end face, the risk of soiling is also reduced, since a smaller end face is less vulnerable to soiling of the kind that occurs when the electric power tool is used at a construction site, for instance.

In an advantageous embodiment of the invention, two recesses are provided on the introduction dome, and the recesses are located mirror-symmetrically to one another, and the plane of symmetry extends through the longitudinal axes of the introduction dome. Because of this structural design, as the power supply module drops into place, a symmetrical load distribution at the module-tool interface is obtained.

The invention is described in further detail in the ensuing description in terms of an exemplary embodiment shown in the drawing.

DESCRIPTION OF THE PREFERRED EMBODIMENTS

Figure 1:
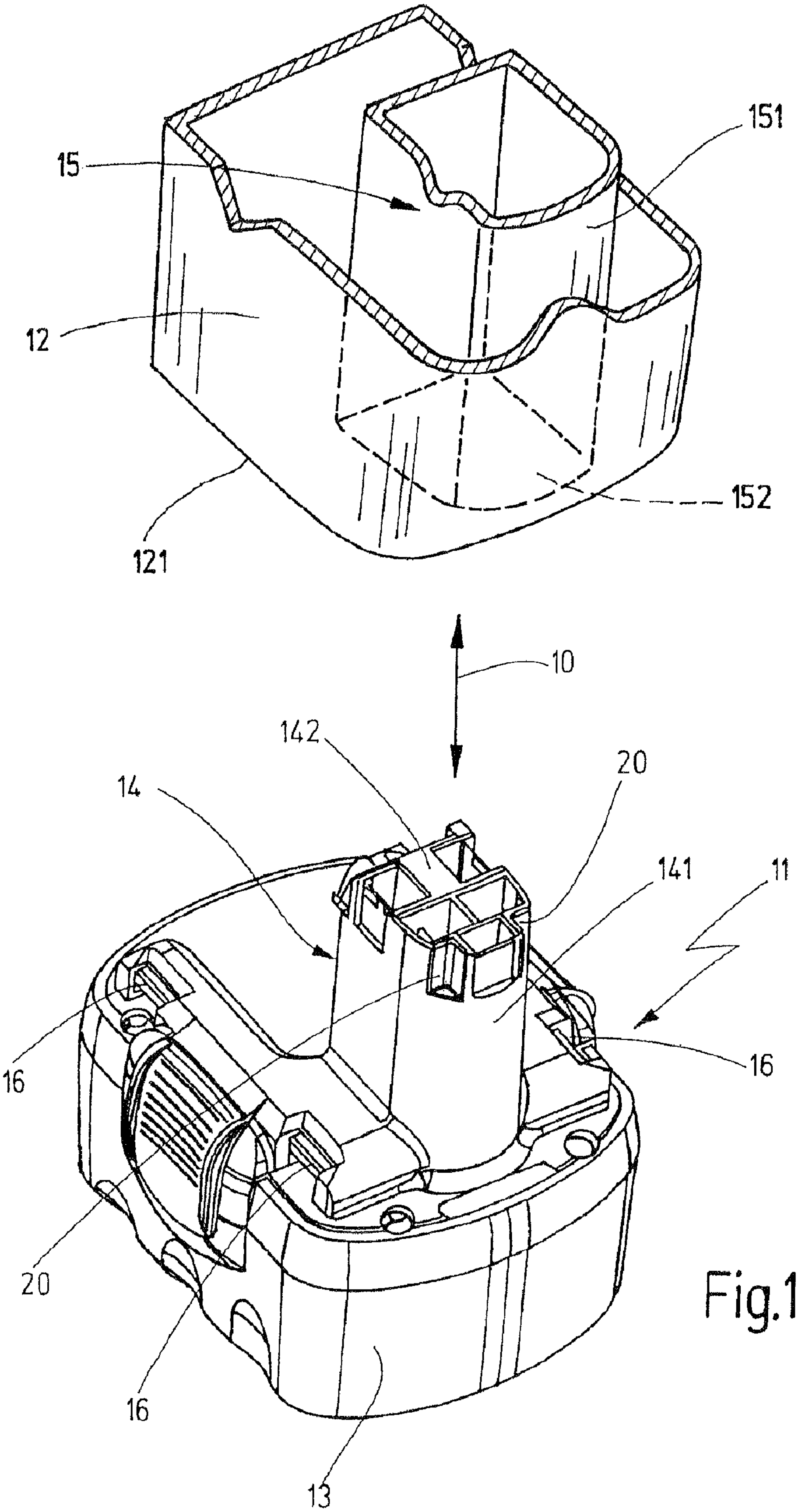
FIG. 1 a perspective view from below of a power supply module for an electric power tool, in association with a tool housing, shown in fragmentary form represented by a lower end of the handle, of an electric power tool.

In FIG. 1, a power supply module 11, also called a battery pack, for an electric power tool, such as a battery-operated power drill or a battery-operated screwdriver, is shown in a view from below. Of the electric power tool, what is shown is the lower end of the tool housing 12, shaped here into a handle, in perspective in association with the power supply module 11. By means of an axial attachment motion in the direction of the arrow 10 in FIG. 1, the power supply module 11 is attached to the tool housing 12 and taken off again from the tool housing 12 for changing; after the power supply module 11 is attached and the module 11 is locked to the tool housing 12, the electric motor of the electric power tool is automatically coupled to the power supply module 11.

The power supply module 11 has a module housing 13, which receives a battery or an accumulator (rechargeable battery); an introduction dome 14 protruding at a right angle is formed integrally onto the underside, oriented toward the tool housing 12, of the power supply module. A guide sleeve 15 is embodied in the tool housing 12; it is shown only schematically and in fragmentary form in FIG. 1, but in FIGS. 2 and 3 it can be seen in its constructed design in fragmentary form. The guide sleeve 15 has an introduction opening 152 and, on its end remote from the introduction opening, it has electrical contacts, to which the electric motor of the electric power tool is connected.

Upon attachment of the power supply module 11 to the tool housing 12, the introduction dome 14 is inserted axially into the guide sleeve 15, until the module housing 13 strikes the lower end edge 121 of the tool housing 12, and clips provided on the tool housing 12 snap into detent recesses 16 that are embodied on the module housing 13. Electrical contacts 17 (FIGS. 2 and 3) are located on the free end of the introduction dome 14 and are connected to the battery or the accumulator in the module housing 13. At the end of the insertion motion of the introduction dome 14, these contacts 17 contact the contacts located in the tool housing 12.

Although not shown in detail here, to aid in introducing the introduction dome 14 into the guide sleeve 15, interception ribs are disposed on the one hand on the inner wall of the guide sleeve 15, extending axially as far as the introduction opening of the guide sleeve 15, and corresponding groovelike rib receptacles are machined into the outer wall 141 of the introduction dome 14 on the other hand; they end at the free end of the introduction dome 14 and each receives one of the interception ribs with displacement play by form-locking engagement. To achieve a good seat of the power supply module 11 on the tool housing 12 after the insertion of the introduction dome 14 into the guide sleeve 15 and to achieve a largely play-free fixation of the end portion of the introduction dome 14 in the guide sleeve 15 so as to enhance the vibration resistance of the contacting at the module-tool interface, the guide sleeve 15 and the introduction dome 14 have form-locking elements that correspond with one another and that are located respectively on the end, remote from the introduction opening, of the guide sleeve 15 and on the free end of the introduction dome 14, so that they come into engagement with one another only toward the end of the insertion travel of the introduction dome 14.

The at least one form-locking element on the guide sleeve 15 is embodied as an axially oriented rib 21, which protrudes from the side wall of the guide sleeve 15 and which extends, from the end of the guide sleeve 15 remote from the introduction opening, over only a short end portion of the guide sleeve 15. The at least one form-locking element on the introduction dome 14 is embodied as a recess, which is made in the side wall of the introduction dome 14 and comes to an end in the open on the free end of the introduction dome 14. The recess 20 and the rib 21 can be seen in FIG. 2.

Figure 2:
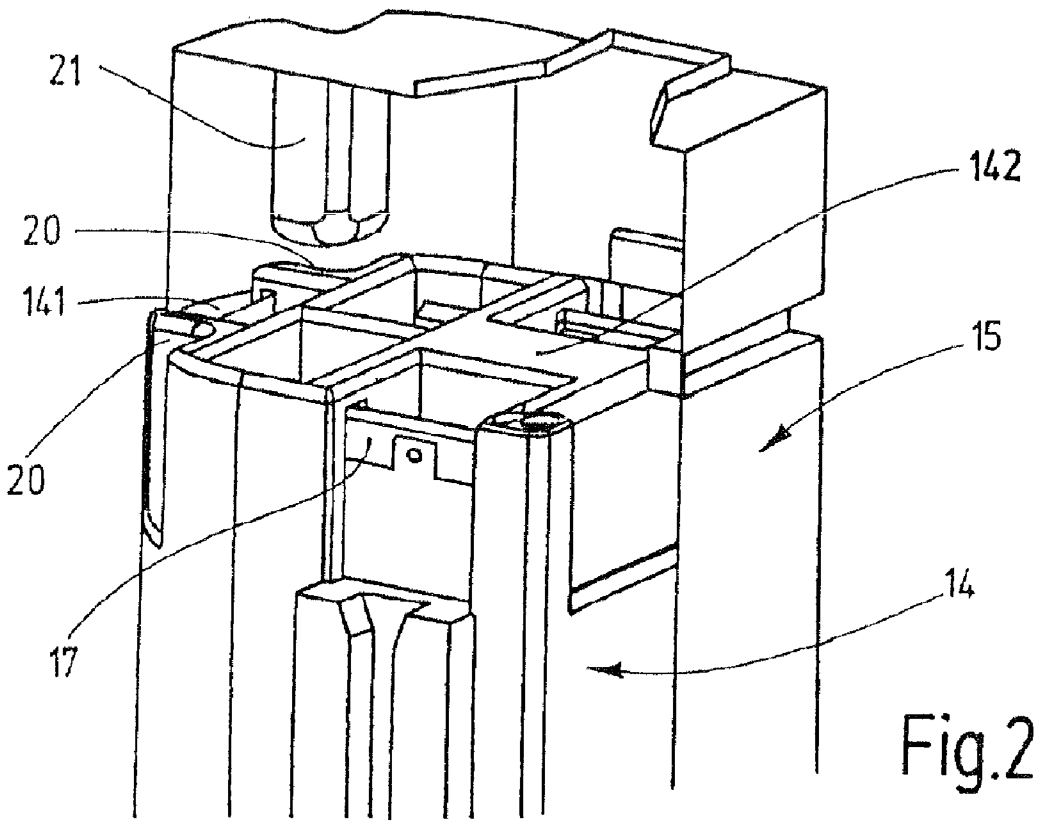
FIGS. 2 and 3 each in fragmentary form, a perspective view of a guide sleeve embodied in the tool housing and of an introduction dome embodied in the power supply module, which dome is inserted partway (FIG. 2) and all the way (FIG. 3) into the guide sleeve.
Figure 3:
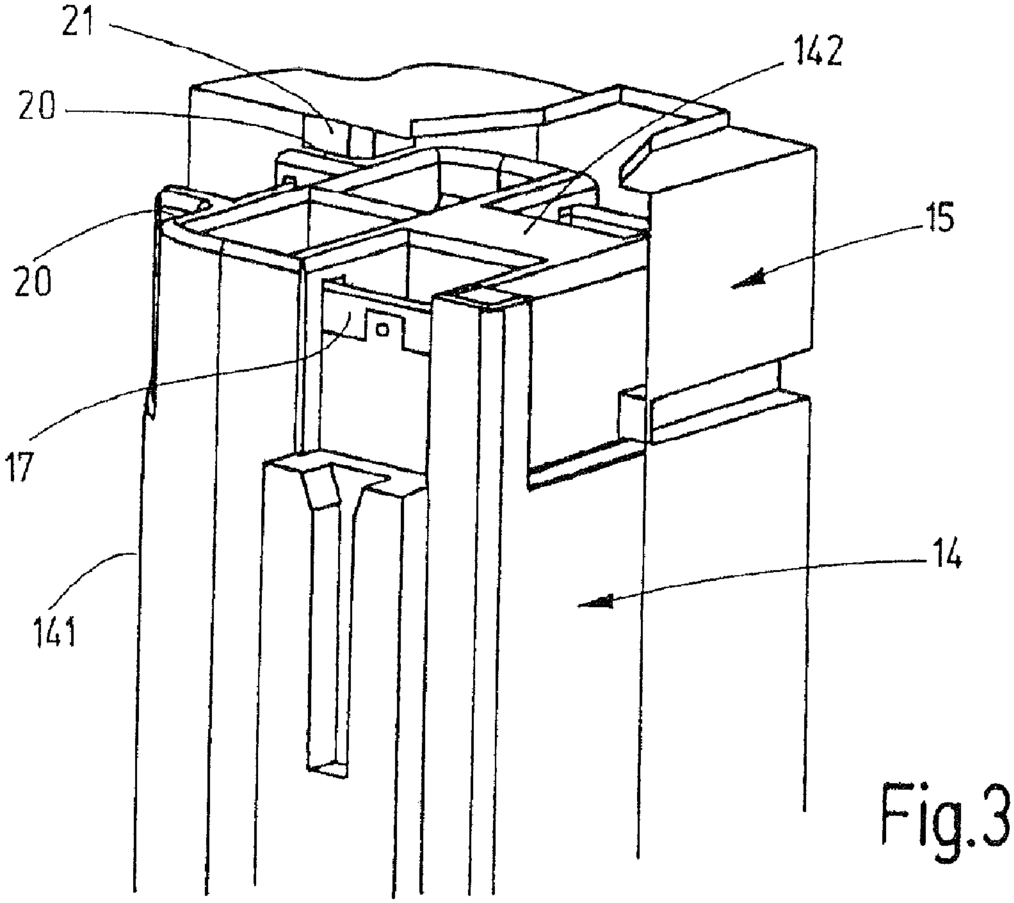

In the exemplary embodiment described, there are two recesses 20 and two ribs 21, each located mirror-symmetrically to one another on the introduction dome 14 and on the guide sleeve 15, respectively. Both the guide sleeve 15 and the introduction dome 14 have a boxlike profile, with a convex profile wall 151 and 141, respectively. The two recesses 20 are located mirror-symmetrically in the convex profile wall 141 of the introduction dome 14, and the two ribs 21 are located mirror-symmetrically in the convex profile wall 151 of the guide sleeve 15; the plane of symmetry extends through the longitudinal axes of the introduction dome 14 and of the guide sleeve 15, respectively. In FIGS. 2 and 3, the two recesses 20 coming to an end in the end face 142 of the introduction dome 14 can be seen, while of the two ribs 21, only one is shown. In FIG. 2, the introduction dome 14 is inserted only far enough into the guide sleeve 15 that the ribs 21 still do not dip into the recesses 20, while in FIG. 3, the introduction dome 14 is inserted all the way into the guide sleeve 15, and the ribs 21 are thus received in form-locking fashion in the recesses 20.

The ribs 21 are embodied in one piece with the guide sleeve 15 and have an axial length that is less than the axial length of the recesses 20. For the sake of favorable dipping of the ribs 21 into the recesses 20, which occurs toward the end of the insertion travel of the introduction dome 14, the end faces of the ribs 21 pointing toward the introduction opening 152 of the guide sleeve 15 are provided with rounded edges, as can be seen in FIG. 2 on the face end of the rib 21 pointing toward the introduction dome 14. The ribs 21 have a triangular cross section, and the recesses 20 correspondingly have a triangular inside cross section. However, the one tip of the cross sections is advantageously flattened, creating trapezoidal cross sections. The larger outline of the trapezoid of the inside cross section of the recesses 20 points toward the rib 21. The larger outline of the trapezoidal cross section of the rib 21 rests on the side wall of the guide sleeve 15.

What is claimed is:

1. A power supply module for interchangeable attachment to a tool housing (12) of an electric power tool, comprising a module housing (13) that receives a battery or an accumulator;

an introduction dome (14) for guiding attachment of the power supply module to the tool housing (12), which introduction dome (14) is formed integrally on the module housing and on which there is an electrical interface with the electric power tool; and at least one form-locking element for producing a form lock with the tool housing (12), which form-locking element comprises a recess (20) formed in a side wall and located on a free end of the introduction dome (14), wherein an axial length of the recess (20) is less than an axial length of the introduction dome (14).

2. The power supply module in accordance with claim 1, wherein the recess (20) extends into an opening on the free end of the introduction dome (14).

3. The power supply module in accordance with claim 1, wherein the recess (20) has a triangular inside cross section.

4. The power supply module in accordance with claim 1, wherein the recess (20) has a trapezoidal inside cross section, with a larger trapezoidal outline pointing away from the introduction dome (14).

5. The power supply module in accordance with claim 1, wherein two recesses (20) spaced apart from one another are provided, which are located mirror-symmetrically to one another, and a plane of symmetry extends through a longitudinal axis of the introduction dome (14).

6. The power supply module in accordance with claim 5, wherein the introduction dome (14) has a box-shaped profile, with a convex profile wall (141), and the two recesses (20) are located in the convex profile wall (141).

7. A power supply module for interchangeable attachment to a tool housing (12) of an electric power tool in an axial direction of insertion, comprising:

a module housing (13) that receives a battery or an accumulator; and an introduction dome (14) for guiding attachment of the power supply module to the tool housing (12), which introduction dome is formed integrally on the module housing and extending in the direction of insertion and on which there is an electrical interface with the electric power tool, wherein at least one form-locking element for producing a form lock with a form-locking element of the tool housing (12) is located on a free end of the introduction dome (14), said at least one form-locking element being a recess (20) located in a side wall of the introduction dome (14) and extending in a direction of insertion, wherein the recess (20) extends into an opening on a free end of the introduction dome (14) and over a limited portion of the introduction dome in such a manner that the recess (20) and the form-locking element of the tool housing (12) come into engagement with one another only toward an end of an insertion travel of the power supply module.

* * * * *